(12) United States Patent
Haycraft et al.

(10) Patent No.: US 12,063,223 B1
(45) Date of Patent: Aug. 13, 2024

(54) SECURITY EVENT ANALYSIS AND REMEDIATION SYSTEM

(71) Applicant: Amazon Technologies, Inc., Seattle, WA (US)

(72) Inventors: Joshua Haycraft, Issaquah, WA (US); Vignesh Janakiraman, Frisco, TX (US); Jessica Erin Clark, Lake Forest Park, WA (US); Pradeep Ramarao, Kirkland, WA (US); Karthik Kumar Odapally, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 407 days.

(21) Appl. No.: 16/711,345

(22) Filed: Dec. 11, 2019

(51) Int. Cl.
*H04L 29/06* (2006.01)
*H04L 9/40* (2022.01)

(52) U.S. Cl.
CPC ...... *H04L 63/1416* (2013.01); *H04L 63/1425* (2013.01)

(58) Field of Classification Search
None
See application file for complete search history.

(56) References Cited

U.S. PATENT DOCUMENTS

| | | | | |
|---|---|---|---|---|
| 8,590,014 | B1* | 11/2013 | Haugsnes | H04L 63/1433 726/3 |
| 9,516,053 | B1* | 12/2016 | Muddu | G06F 16/285 |
| 9,690,931 | B1* | 6/2017 | Anantharaju | G06N 5/04 |
| 10,120,746 | B1* | 11/2018 | Sharifi Mehr | H04L 63/1425 |
| 2011/0252132 | A1* | 10/2011 | Wetzer | G06F 9/542 709/224 |
| 2014/0013434 | A1* | 1/2014 | Ranum | H04L 67/10 726/24 |
| 2016/0127417 | A1* | 5/2016 | Janssen | H04L 63/1433 726/1 |
| 2020/0014538 | A1* | 1/2020 | Liu | H04L 9/3231 |

FOREIGN PATENT DOCUMENTS

WO  WO-2019243579 A1 * 12/2019 ......... H04L 63/1408

* cited by examiner

*Primary Examiner* — Benjamin E Lanier
(74) *Attorney, Agent, or Firm* — Davis Wright Tremaine LLP

(57) ABSTRACT

Systems and methods for implementing a system for analyzing large amounts of event data to determine any potential security threats or anomalies. Event data may be obtained and processed. The processed event data may be analyzed to detect any potential security threats or anomalies.

21 Claims, 10 Drawing Sheets

SECURITY EVENT ANALYSIS AND REMEDIATION SYSTEM

BACKGROUND

The analysis of large amounts of event data presents many technical challenges. In some cases, a computing service provider may desire to analyze event data to identify and mitigate any potential security concerns or anomalies. Complicating this aim, however, is that there may be a large volume of event data that must be analyzed in order to determine any potential security concerns or anomalies. The efficient and accurate analysis of large amounts of event data to determine potential security concerns or anomalies is difficult and complex.

BRIEF DESCRIPTION OF THE DRAWINGS

Various techniques will be described with reference to the drawings, in which.

DETAILED DESCRIPTION

Figure 1:
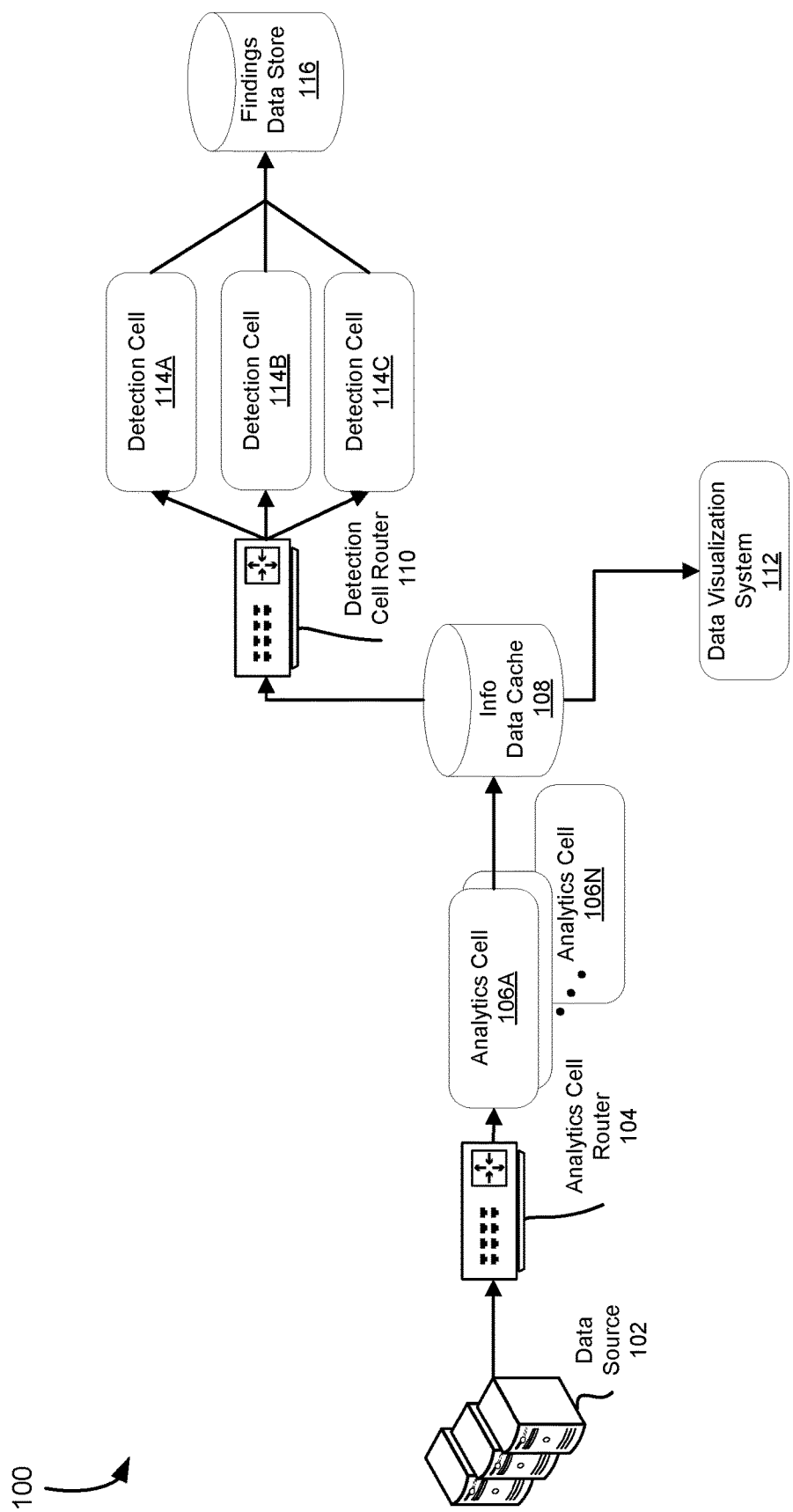
FIG. 1 illustrates an example of a system, according to at least one embodiment.

As described in greater detail herein below, systems and methods may be utilized to implement a system for efficient and accurate processing of large amounts of data to detect various conditions, anomalies, events, and the like. In various embodiments, a first routing service of a computing resource service provider may receive a notification message. The first routing service may be referred to as an analytics cell router. The notification message may be based in part on generation of event data associated with an account of the computing resource service provider. In some examples, the generation of the event data may cause the notification message to be generated and/or sent. The event data may be associated with one or more customers of the computing resource service provider. The event data may comprise data such as event logs, metadata, and/or any such data related to customers, as well as actions of the customers, of the computing resource service provider.

The first routing service may determine a customer identifier from the notification message. The customer identifier may be determined from the content of the notification message. The first routing service may parse the notification message to determine the customer identifier. The first routing service may then map the customer identifier to a queue of a plurality of queues, wherein the plurality of queues correspond to a respective plurality of analytics systems. In some examples, one or more queues of the plurality of queues may be associated with specific event data, such as event data from a specific location, event data from a specific subset of customers, and/or variations thereof. The first routing service may map the customer identifier based on one or more factors associated with the notification message and the event data. In some examples, an analytics system may be referred to as an analytics cell. The first routing service may utilize a consistent hashing scheme to map the customer identifier to the appropriate queue. The first routing service may enqueue the notification message in the queue of the plurality of queues.

An analytics system of the plurality of analytics systems, which may correspond to the queue, may obtain the notification message from the queue. The analytics system may use the notification message to obtain the event data from a network location of the computing resource service provider. In some embodiments, the notification message may indicate the network location. Furthermore, in some examples, the network location may correspond to a location within one or more data stores provided by one or more data storage services, which may be associated with the computing resource service provider. The analytics system may access the location specified by the network location to obtain the event data.

The analytics system may process the event data to produce processed data. The analytics system may perform various processes in connection with the event data. The analytics system may parse and de-serialize the event data, and perform various aggregation, enrichment, and correlation actions on the event data to generate the processed data. The analytics system may then make the processed data available to a data stream. In some examples, the analytics system may utilize a data stream service to transmit the processed data in the data stream.

A data processing service of the computing resource service provider may obtain the processed data from the data stream. In some embodiments, the data processing service may be referred to as a data visualization system. The data processing service may provide, based at least in part on the processed data, one or more interfaces that may provide one or more visualizations of the processed data. In some examples, the one or more interfaces may be usable by customers of the computing resource service provider to visualize the processed data, query the processed data, analyze the processed data, and/or variations thereof.

A second routing service of the computing resource service provider may also obtain the processed data from the data stream. In some embodiments, the second routing service may be referred to as a detection cell router. The second routing service may obtain the processed data and route it to one or more detection cells. The detection cells may comprise one or more detection logics that may be run on the processed data to identify one or more security events. The detection cells may be configured to run the one or more detection logics on the processed data to identify any potential security events or anomalies. The results, which may comprise indications of various security events or anomalies that may have been detected from the processed data, may be provided to one or more databases for further processing.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: increasing computer security and robustness to electronic based attacks to the processing and detection of security events within large amounts of event data, enabling a system to process and group large amounts of event data to be more easily processed, enabling a system to scale in response to processing large amounts of event data, and more.

FIG. 1 illustrates an example 100 of a system, which may be referred to as a detections system or a unified detections system. The system may comprise a data source 102, an analytics cell router 104, analytics cells 106A-106N, an info data cache, a data visualization system 112, a detection cell router 110, detection cells 114A-114C, and a findings data store 116. The analytics cell router 104 may route data received from the data source 102 to the analytics cells 106A-106N, which may process the data and provide the processed data to the info data cache 108. The info data cache 108 may provide the processed data to the data visualization system 112 and the detection cell router 110, which may provide the processed data to the detection cells 114A-114C, which may provide findings based off of the processed data to the findings data store 116.

In various embodiments, components of the example 100 may be implemented as software, hardware, and/or variations thereof. In some examples, the components may be implemented as software applications or services executing on various computing devices. Examples of such computing devices include one or more instances of a physical computing instance (e.g., a physical server computer, a mobile communication device, a laptop computer, a tablet computer, a personal computer, a mainframe, etc.) or one or more instances of a virtual computing instance, such as a virtual machine hosted on one or more computer servers, or other computing system capable of communicating with various systems and/or services. In some embodiments, the components may be implemented by an event-driven compute service, such as those described in connection with FIG. 6.

Furthermore, the components may utilize various resources provided by various computing resource providers that may be scaled according to workloads and usages of the components. In various embodiments, the components may be scaled based on the workloads of the components. The components may be continuously provisioned and de-provisioned resources based on the workload of the components. For example, the analytics cell router 104 may be provisioned more or less resources based on the volume of data provided by the data source 102. Additionally, in various embodiments, the components may be utilized independently and in any order, including parallel.

The data source 102 may be any source of data and may comprise various sources of data. The data source 102 may comprise various sources of data that may relate to various services and service providers. In various embodiments, the data source 102 may provide data associated with customers of a computing service provider. The data source 102 may provide data associated with various actions of the customers of the computing service provider. The data source 102 may also provide metadata relating to the customers. The data source 102 may also provide data that may be associated with various errors that customers of the computing service provider may encounter. The data source 102 may provide data such as event logs, metadata, and any such data related to the customers, as well as actions of the customers, of the computing service provider. In various examples, the data source 102 may be configured to provide notifications to the analytics cell router 104 when the data source 102 obtains new data or has data available.

The analytics cell router 104 may be a system configured to receive and route data obtained from the data source 102. In various embodiments, the data source 102 may be one of a plurality of data sources, in which there may be an analytics cell router like the analytics cell router 104 that may be configured for each data source of the plurality of data sources. In various examples, the data source 102 may obtain event data associated with one or more customers of the computing service provider. The data source 102 may provide a message, such as a notification, indication, and/or variations thereof, that may indicate that the event data has been obtained by the data source 102 to the analytics cell router 104. In some embodiments, the message may be a data object that may indicate a customer identifier associated with a specific customer that may be associated with the event data. The message may additionally indicate a data location where the event data may be stored.

The analytics cell router 104 may receive the message from the data source 102 and perform various processes in connection with the message. The analytics cell router 104 may map or otherwise associate the message to one or more analytics cells of the analytics cells 106A-106N. The analytics cell router 104 may map the message by generating a hash from the customer identifier indicated in the message and mapping the hash to an analytics cell of the analytics cells 106A-106N. The analytics cell router 104 may parse the message to determine the customer identifier. The analytics cell router 104 may comprise one or more databases that may associate customer identifiers with specific analytics cells. In various embodiments, the one or more databases may be configured to map a hash generated by a hash function from a customer identifier to a specific analytics cell. In some examples, the one or more databases may utilize a consistent hashing scheme that may map various customer identifiers from various messages to various analytics cells. It should be noted that, in various embodiments, a group of customer identifiers may map to the same analytics cell. In some examples, the message may be associated with a specific subset of data, and may be mapped to an analytics cell of the analytics cells 106A-106N that may be associated with the specific subset of data. In some embodiments, the message may be mapped to an analytics cell of the analytics cells 106A-106N based on any field, indicator, identifier, and/or variations thereof that may be associated with the message. The analytics cell router 104 may utilize any rules, logic, heuristics, and/or variations thereof, which may be based one or more characteristics or aspects of the message and/or the event data, to map the message. For example, messages associated with event data from a specific geographical region may be mapped to analytics cells that may be associated with the specific geographical region. Continuing with the example, the analytics cells associated with the specific geographical region may be utilized to isolate the event data from the specific geographical location from event data from other geographical locations. As another example, messages may be associated with a specific organization or entity, in which the messages may be routed to specific analytics cells that are associated with the specific organization or entity. Continuing with the example, the specific analytics cells may be utilized to isolate event data from the specific organization or entity from other organizations or entities. In various examples, various restrictions and/or regulations may be associated with messages that may dictate which analytics cells the messages may be mapped to.

The analytics cell router 104 may utilize a hash function to determine a hash key from the customer identifier. In some examples, a hash key, or hash, may refer to a cryptographically strong hash that may be computationally infeasible to decrypt and/or forge, and may be of negligible probability that two distinct values can be computed or found such that the hash of one distinct value may equal a hash of another distinct value. In various embodiments, the hash function may be a cryptographic hash function, and may include one or more functions such as those of the Secure Hash Algorithm (SHA) family. The analytics cell router 104 may determine a hash key from the customer identifier and map it to an analytics cell of the analytics cells 106A-106N. In some examples, the analytics cell router 104 may map the hash key to any one of the analytics cells 106A-106N. The analytics cell router 104 may map the hash key to the analytics cell 106A utilizing the consistent hashing scheme as described above. In some examples, the message may be mapped to an analytics cell of the analytics cells 106A-106N based on various other factors, such as processing load, processing latency, workload, and/or variations thereof. For example, the analytics cell router 104 may analyze the analytics cells 106A-106N, determine that the analytics cell 106A has the lowest processing latency of the analytics cells 106A-106N, and map the message to the analytics cell 106A. In various examples, an analytics cell of the analytics cells 106A-106N may be chosen such that processing load is evenly distributed across the analytics cells 106A-106N. In various embodiments, the analytics cells 106A-106N may comprise any number of analytics cells. The number of analytics cells of the analytics cells 106A-106N may be proportional to the volume of data provided by the data source 102.

The analytics cell router 104 may route the message received from the data source 102 to the analytics cell 106A. The analytics cell 106A may receive the message, and store the message in one or more data stores. In some examples, the analytics cell 106A may store the message in a queue, in which the analytics cell 106A may process each message stored within the queue. In various embodiments, the analytics cell 106A may store each incoming message in the queue, and process the incoming messages sequentially in the order that the incoming messages were received. The analytics cell 106A may obtain the event data indicated in the message. In some examples, the analytics cell 106A may obtain the event data from the data source 102. In various examples, the analytics cell 106A may obtain the event data from one or more data stores that may be associated with the data source 102. In various embodiments, the message may indicate a network location where the event data may be stored; the analytics cell 106A may utilize the network location to retrieve the event data.

The analytics cell 106A may then perform one or more processes on the event data. The analytics cell 106A may de-serialize the event data. In some examples, the de-serialization of the event data may comprise various operations that may construct data structures or objects from the event data. In various embodiments, the event data may be the result of the serialization of a data object; the de-serialization of the event data may reconstruct the data object. The analytics cell 106A may parse the event data by analyzing the syntax and content of the event data and determining one or more characteristics of the event data. The analytics cell 106A may comprise various algorithms that may parse the event data and determine and/or indicate one or more characteristics of the event data. The analytics cell 106A may then provide the de-serialized and parsed event data to an analytics engine which may be a component of the analytics cell 106A.

The analytics cell 106A may further perform a set of aggregations on the event data that may aggregate portions of the event data together. In some examples, the set of aggregations may comprise various operations that may group portions of the event data into various groups corresponding to various categories. The set of aggregations may aggregate portions of the event data into time ranges or intervals, such that a specific time range may comprise data of the event data that may be associated with the specific time range. In some examples, the set of aggregations may aggregate portions of the event data into groups of customer identifiers, in which a group may comprise data of the event data that may be associated with a specific subset of customer identifiers. The analytics cell 106A may perform various enrichment actions that may enrich the event data. The enrichment actions may include various processes that may process the event data into various other formats. The enrichment actions may further include processes that may analyze the event data, and discard any non-relevant data of the event data and emphasize important data of the event data. The analytics cell 106A may perform various correlation actions on the event data. The correlation actions may comprise various processes that may determine any trends within the event data. The correlation actions may utilize various databases of known trends to determine trends within the event data. The correlation actions may further include operations that may classify one or more aspects or trends within the event data. It should be noted that, in various embodiments, there may be different types of analytics cells that may correspond to different events, conditions, and/or variations thereof. For example, an analytics cell of the analytics cells 106A-106N may be configured as a custom analytics cell, which may comprise a custom set of analytics processes which may be provided by one or more entities. Continuing with the example, a custom analytics cell may only apply to a specific subset of customer identifiers, and may process data associated with the specific subset of customer identifiers. As another example, an analytics cell of the analytics cells 106A-106N may be configured as a global analytics cell, which may comprise a global set of analytics processes which may process any data that may be input to the global analytics cell. As another example, an analytics cell of the analytics cells 106A-106N may be configured as an isolation analytics cell, which may be configured to assist a global analytics cell such that, if the global analytics cell is processing a sufficiently large amount of data, the isolation analytics cell may be utilized to assist in the processing of the large amount of data. In various embodiments, a threshold amount of data may be defined such that, if data being processed within a global analytics cell surpasses the threshold amount, an isolation analytics cell may be utilized to offload and process some of the data from the global analytics cell. In some examples, an isolation analytics cell may be configured such that it may only process data originating from a specific subset of customer identifiers, which may be associated with a specific subset of customers that may be denoted as "high bandwidth" customers that may generate large amounts of data. In some examples, an analytics cell of the analytics cells 106A-106N may be configured as a historical event analytics cell, which may be configured to process historic event data. The historical event analytics cell may specify a time frame. The historical event analytics cell may obtain and/or receive data associated with the specified time frame, and process the data. It should be noted that the analytics cells 106A-106N may comprise any number of analytics cells which may be configured to process input data in any manner.

The analytics cell 106A may provide the processed data to the info data cache 108. In some examples, the analytics cell 106A may transmit the processed data utilizing a data stream that the info data cache 108 may access. The data stream may be provided by one or more data stream services, in which the analytics cell 106A may utilize the services to stream the processed data within one or more data streams to various systems. In various embodiments, the processed data may be the event data that has been de-serialized and parsed, and has undergone various aggregation, enrichment, and correlation actions. The info data cache 108 may be a data store, or cache, that may store processed data. The info data cache 108 may be configured to aggregate and store processed data from a plurality of analytics cells, such as the analytics cells 106A-106N. The info data cache 108 may additionally be configured to provide processed data received from various analytics cells to various other systems, such as the data visualization system 112 and the detection cell router 110. In some embodiments, the info data cache 108 may provide the processed data back to the analytics cell router 104, which may, through the analytics cells 106A-106N, perform additional aggregation, enrichment, and correlation actions on the processed data to further refine the processed data. In various embodiments, by having the info data cache 108 directly provide the processed data back to the analytics cell router 104, the processed data can be further enriched, aggregated, and/or correlated such that various conditions, events, anomalies, and/or variations thereof that may be present within the processed data may be more easily detected, and the processed data may be more easily processed by various other systems, such as the data visualization system 112. The info data cache 108 may comprise various components that may convert processed data into formats that may be readily accessible by various other systems, such as the data visualization system 112 and the detection cell router 110. The info data cache 108 may also utilize one or more data streams to provide the processed data to other systems. In some examples, the info data cache 108 may comprise a data store that may store the processed data. The info data cache 108 may utilize a data stream to provide the processed data to the data visualization system 112.

The data visualization system 112 may be a system configured to visualize data and provide one or more interfaces that entities may utilize to interact with data. The data visualization system 112 may receive the processed data, which may be transmitted through a data stream, and generate one or more interfaces and visualizations based on the processed data. The data visualization system 112 may provide one or more services usable by customers of the computing service provider. The data visualization system 112 may allow a customer to define custom dashboards that may relate to a specific set of data of the processed data. The custom dashboards may be utilized by the customer to troubleshoot data of the processed data, as well as detect and analyze any anomalies within the processed data. The data visualization system 112 may further provide interfaces that customers may utilize to search the processed data. For example, a customer may desire to obtain data of the processed data relating to a specific time of day; the customer may utilize the one or more interfaces provided by the data visualization system 112 to query the processed data to find data associated with the specific time of day.

The info data cache 108 may provide a message, such as a notification, indication, and/or variations thereof, that may indicate that the processed data has been obtained by the info data cache 108, to the detection cell router 110. The detection cell router 110 may receive the message from the info data cache 108 and perform various processes in connection with the message. In some examples, the detection cell router 110 may store the message in a queue. In various embodiments, the detection cell router 110 may store each incoming message in the queue, and process the incoming messages sequentially in the order that the incoming messages were received. The detection cell router 110 may obtain the processed data indicated by the message. In some examples, the detection cell router 110 may obtain the processed data from the info data cache 108. In various examples, the detection cell router 110 may obtain the processed data from one or more data stores that may be associated with the info data cache 108. In various embodiments, the message may indicate a network location where the processed data may be stored; the detection cell router 110 may utilize the network location to retrieve the processed data.

The detection cell router 110 may route the processed data to the detection cells 114A-114C. Like the analytics cells, there may be different types of detection cells (e.g., custom cells, global cells, isolation cells, and/or historical event cells) that may correspond to different events, conditions, and/or variations thereof. In some examples, the detection cell router 110 may route the processed data based on the customer identifier associated with the processed data. For example, a detection cell of the detection cells 114A-114C may comprise various detection algorithms that may only apply to a specific subset of customer identifiers, in which only data associated with the specific subset of customer identifiers may be routed to that detection cell. The detection cells 114A-114C may each comprise detection rules which may be configured to detect various security events, anomalies, and/or other various aspects of input data.

For example, a detection cell of the detection cells 114A-114C may be configured as a custom detection cell, which may comprise a custom set of detection rules which may be provided by one or more entities. Continuing with the example, a custom detection cell may only apply to a specific subset of customer identifiers, and may attempt to detect specific conditions within processed data associated with the specific subset of customer identifiers. As another example, a detection cell of the detection cells 114A-114C may be configured as a global detection cell, which may comprise a global set of detection rules which may be configured to detect specific conditions, events, anomalies, and/or variations thereof, of any processed data that may be input to the global detection cell. As another example, a detection cell of the detection cells 114A-114C may be configured as an isolation detection cell, which may be configured to assist a global detection cell such that, if the global detection cell is analyzing a sufficiently large amount of processed data, the isolation detection cell may be utilized to assist in the analysis of the large amount of processed data. In various embodiments, a threshold amount of data may be defined such that, if data being processed within a global detection cell surpasses the threshold amount, an isolation detection cell may be utilized to offload and process some of the data from the global detection cell. In some examples, an isolation detection cell may be configured such that it may only process data originating from a specific subset of customer identifiers, which may be associated with a specific subset of customers that may be denoted as "high bandwidth" customers that may generate large amounts of data.

In some examples, a detection cell of the detection cells 114A-114C may be configured as a historical event detection cell, which may be configured to apply sets of detection rules to historic or previously processed data. The historical event detection cell may obtain a set of detection rules and a specified time frame. The historical event detection cell may further obtain data associated with the specified time frame, and apply the set of detection rules to the data. It should be noted that the detection cells 114A-114C may comprise any additional number of detection cells which may be configured to detect any number of events, anomalies, and/or other various aspects/characteristics of input processed data. The detection cells 114A-114C may receive the processed data from the detection cell router 110, analyze the processed data and apply various detection rules and/or algorithms to detect any security events, anomalies, and/or other various aspects of the processed data, and provide the findings to the findings data store 116. The findings data store 116 may be a data store, database, or any such storage that may provide the findings to one or more other systems for further processing.

In some examples, outputs from the detection cells 114A-114C may be input to the analytics cell router 104 for additional processing. The detection cells 114A-114C may transform processed data input to the detection cells 114A-114C, and output the transformed processed data to the analytics cell router 104 for further processing. The detection cells 114A-114C may transform processed data by indicating and/or annotating various aspects of the processed data; the various aspects may relate to security events, anomalies, pre-defined conditions, and/or variations thereof. The detection cells 114A-114C may also transform processed data by emphasizing portions of the processed data that may relate to various events, conditions, and the like. The transformed processed data may be continuously cycled through various components of the example 100 (e.g., from the detection cells 114A-114C to the analytics cell router 104, then to the analytics cells 106A-106N, then to the info data cache 108, then to the detection cell router 110, then to the detection cells 114A-114C, then back to the analytics cell router 104, and so on) to drive more focused detections.

It should be noted that data being processed through the components of the example 100 may be encrypted, cryptographically protected, or otherwise protected. In some examples, data output from a component may be associated with temporary security credentials that may be utilized by another component that may receive the data output. For example, processed data output from the analytics cells 106A-106N may be associated with temporary security credentials that may be utilized by the info data cache 108 to access and/or obtain the processed data. Additionally, access to data being processed through the components may require specific security credentials. Furthermore, each component of the example 100 may be associated with a specific subset of security credentials that may be required to access and/or utilize the specific component.

Additionally, in various embodiments, various processes performed by the components of the example 100 may be automatic and based on various triggers. The components may perform various actions based on triggers from other components. For example, the data source 102 may obtain event data and transmit a notification message to the analytics cell router 104. The analytics cell router 104 may receive the notification message; the receiving of the notification message by the analytics cell router 104 may trigger the analytics cell router 104 to parse the notification message, and map and transmit the notification message to the analytics cell 106A. The analytics cell 106A may receive the notification message; the receiving of the notification message by the analytics cell 106A may trigger the analytics cell 106A to obtain the event data, and so on. Various processes by the data source 102 may trigger various processes by the analytics cell router 104, which may trigger various processes by the analytics cells 106A-106N, which may trigger various processes by the info data cache 108, which may trigger various processes by the data visualization system 112 and the detection cell router 110, which may trigger various processes by the detection cells 114A-114C, which may trigger various processes by the findings data store 116. The triggers may be implemented utilizing an event driven compute service. Further information regarding the event driven compute service may be found in the description of FIG. 6.

Figure 2:
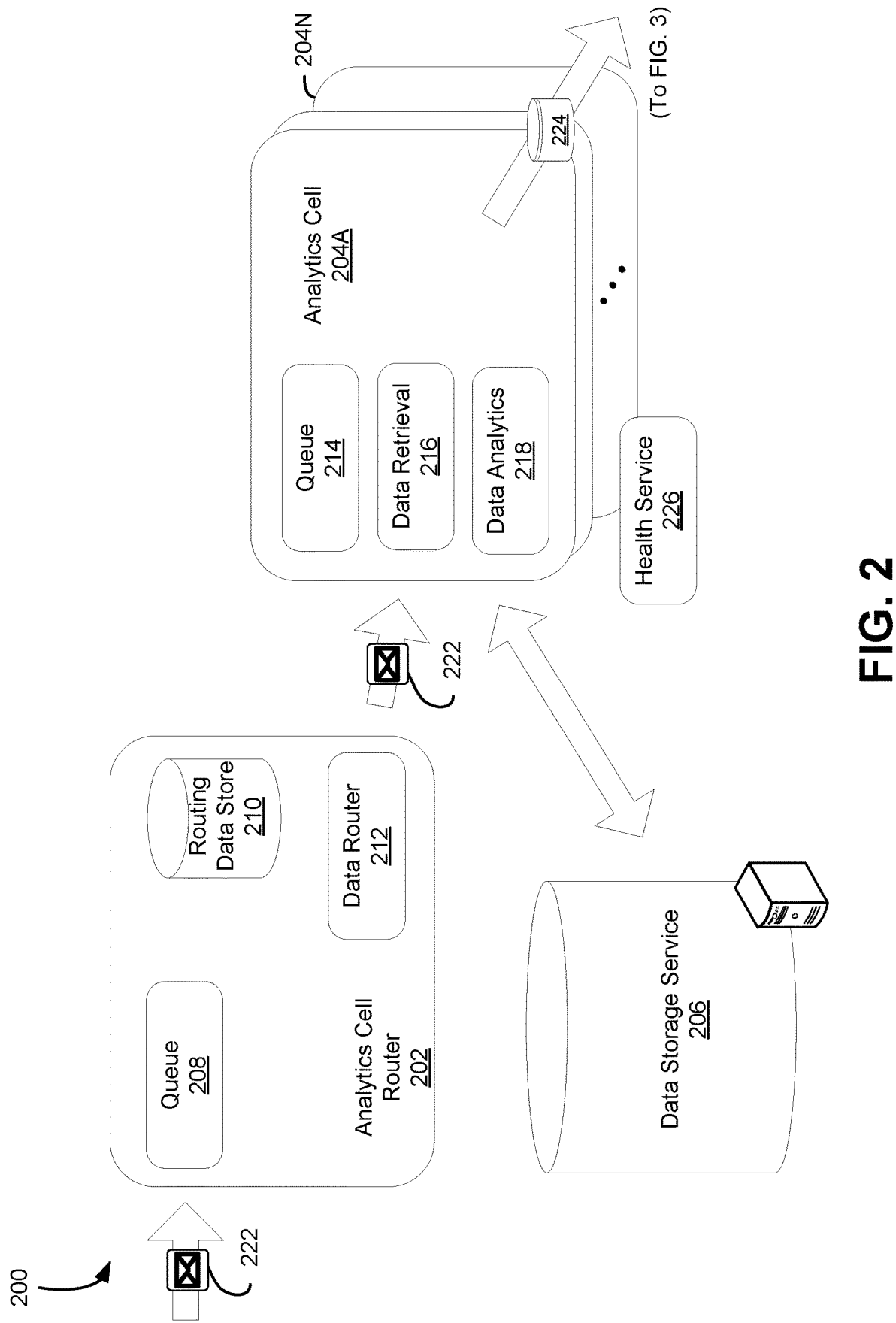
FIG. 2 illustrates an example of an analytics cell router and analytics cells, according to at least one embodiment.

FIG. 2 illustrates an example 200 of an analytics cell router and analytics cells. Specifically, FIG. 2 depicts an analytics cell router 202, which may comprise a queue 208, a routing data store 210, and a data router 212, and may receive a message 222. The analytics cell router 202 may route the message 222 to an analytics cell 204A, which may comprise a queue 214, a data retrieval 216, and a data analytics 218. The analytics cell 204A may access a data storage service 206, and generate processed event data 224. In various embodiments, the analytics cell router 202 and analytics cells 204A-204N may be the same or different as the analytics cell router 104 and analytics cells 106A-106N, respectively, as described in connection with FIG. 1.

The analytics cell router 202 may obtain the message 222. The message 222 may be a notification message from a data source that may indicate that the data source has obtained data. The data source may obtain data such as event logs, metadata, and/or any such data related to customers, and actions of the customers, of a computing service provider, and provide the message 222 to the analytics cell router 202. In some examples, the message 222 may indicate that event data relating to customers of the computing service provider has been obtained. The message 222 may specify a specific customer identifier of a customer that the event data may be associated with. In various embodiments, the message 222 may comprise various fields that may indicate various aspects of the message 222, such as geolocations, timestamps, identifiers, signatures, and/or variations thereof. The various fields may also comprise credential or security information that may be usable by the analytics cell router 202 to access the message 222. The message 222 may additionally indicate a location where the event data may be stored. In some examples, the message 222 may comprise an identifier indicating a location in the data storage service 206 where the event data may be stored.

The analytics cell router 202 may receive the message 222 and store the message 222 in the queue 208. The queue 208 may be a data object that comprises a collection of objects that are maintained in sequence, in which the first object added to the queue 208 may be the first object that is processed from the queue 208. In various embodiments, the queue 208 may be any suitable data structure that may store messages, and the messages may be processed from the queue 208 in any suitable manner. In some embodiments, the queue 208 may be a data structure in which messages from the queue 208 may be retrieved in batches and/or in parallel. For example, the queue 208 may store a plurality of messages, in which messages may be retrieved and/or processed from the queue 208 in batches of a pre-defined number of messages. In some examples, the queue 208 may be utilized to store messages received from various data sources, in which the analytics cell router 202 may process the messages in the order received. The analytics cell router 202 may store the message 222 in the queue 208, and process the message 222 from the queue 208.

The analytics cell router 202 may process the message 222. The analytics cell router 202 may map or otherwise associate the message 222 to an analytics cell of the analytics cells 204A-204N. The analytics cell router 202 may map the message 222 by generating a hash based off of the message 222 and mapping the hash to an analytics cell of the analytics cells 204A-204N. The analytics cell router 202 may parse the message 222 to determine the customer identifier. The analytics cell router 202 may map the customer identifier to an analytics cell of the analytics cells 204A-204N. The analytics cell router 202 may utilize the routing data store 210 to determine which analytics cell to route the message 222 to. The routing data store 210 may be a data store that comprises a mapping of customer identifiers to analytics cells. The routing data store 210 may be configured to map a hash generated by a hash function from a customer identifier to a specific analytics cell. In some examples, the routing data store 210 may utilize a consistent hashing scheme that may map various customer identifiers from various messages to various analytics cells. In various embodiments, analytics cells may be added and/or removed from the analytics cells 204A-204N based on various factors, such as workload and processing requirements, in which the routing data store 210 may track the additions and/or removals and update the hashing scheme accordingly.

The analytics cell router 202 may utilize a hash function to determine a hash key, which may be referred to as a cryptographic key (or simply "key," "cryptographic material," "secret," or other such terms), from the customer identifier. In various embodiments, the hash function may be a cryptographic hash function, and may include one or more functions such as those of the Secure Hash Algorithm (SHA) family and/or variations thereof. The analytics cell router 202 may determine a hash key from the customer identifier and map it to an analytics cell of the analytics cells 204A-204N. In some examples, the analytics cell router 202 may map the hash key to any one of the analytics cells 204A-204N. The analytics cell router 202 may map the hash key to the analytics cell 204A. In some examples, the message 222 may be mapped to an analytics cell of the analytics cells 204A-204N based on various other factors. For example, the analytics cell router 202 may analyze the analytics cells 204A-204N, determine that the analytics cell 204A has the lowest processing latency of the analytics cells 204A-204N, and map the hash key to the analytics cell 204A. In various embodiments, the analytics cells 204A-204N may comprise any number of analytics cells, and the number of analytics cells may depend on the volume of data and/or messages processed by the analytics cell router 202. In various embodiments, the number of analytics cells of the analytics cells 204A-204N may be proportional to the volume of messages processed by the analytics cell router 202.

The analytics cell router 202 may route the message 222 to the analytics cell 204A. The analytics cell router 202 may utilize the data router 212 to route the message 222. The data router 212 may be a networking component of the analytics cell router 202 that may be configured to route and transmit data to one or more other systems. The data router 212 may utilize various communication networks and protocols to transmit data. The data router 212 may route the message 222 to the analytics cell 204A. The analytics cell 204A may receive the message 222 and store the message 222 in the queue 214. The analytics cell 204A may process each message stored within the queue 214. In various embodiments, the analytics cell 204A may store each incoming message from the analytics cell router 202 in the queue 214, and process the messages sequentially in the order that the messages were received. The analytics cell 204A may obtain the event data indicated in the message 222. The analytics cell 204A may utilize the data retrieval 216 to obtain the event data.

The data retrieval 216 may be a component of the analytics cell 204A that may be configured to access data storage services. The data retrieval 216 may utilize various communication networks to access various data storage services. In some examples, the data retrieval 216 may utilize an application programming interface (API) to interact with various data storage services. In some examples, the data retrieval 216 may obtain the event data from the data storage service 206. In various examples, the data retrieval 216 may obtain the event data from one or more data stores that may be associated with the data storage service 206 or other data storage services. In various embodiments, the message 222 may indicate a location in the data storage service 206 where the event data may be stored; the data retrieval 216 may submit a request to the data storage service 206 comprising the location to retrieve the event data from the data storage service 206.

The data analytics 218 may then perform one or more processes on the retrieved event data. The data analytics 218 may be a component of the analytics cell 204A that may comprise various processing algorithms and functions. The data analytics 218 may be configured process the event data to reduce the size and complexity of the event data such that the processed event data may be more easily utilized and/or analyzed by one or more other systems. The data analytics 218 may de-serialize the event data. In some examples, the de-serialization of the event data may comprise various operations that may construct data structures or objects from the event data. In various embodiments, the event data may be the result of the serialization of one or more data structures; the de-serialization of the event data may reconstruct the one or more data structures. The data analytics 218 may parse the event data by analyzing the syntax of the event data and determining one or more characteristics of the event data. The data analytics 218 may comprise various algorithms that may parse the event data and determine one or more aspects of the event data, such as characteristics of the content of the event data, and so on. The de-serialized and parsed event data may be provided to an analytics engine, which may be another processing component of the data analytics 218. In some examples, the de-serialized and parsed event data may be pushed into a data stream that may be processed by the analytics engine.

The data analytics 218 may further perform a set of aggregations that may aggregate portions of the event data together. In some examples, the set of aggregations, which may be referred to as aggregation actions, may comprise various operations that may classify and group portions of the event data into various categories. The set of aggregations may aggregate portions of the event data into time ranges or intervals, such that a specific time range may comprise data of the event data that may be associated with the specific time range. The set of aggregations may aggregate portions of the event data into various different types of events. The data analytics 218 may perform various enrichment actions on the event data. The enrichment actions may include various processes that may process the event data into various other formats. The enrichment actions may further include processes that may analyze the event data, and discard any non-relevant data of the event data and emphasize relevant data of the event data. The data analytics 218 may perform various correlation actions on the event data. The correlation actions may comprise various processes that may determine any trends within the event data. The correlation actions may utilize various databases of data trends to determine trends within the event data. The correlation actions may further include operations that may classify one or more aspects of the event data. In some examples, the correlation actions may annotate one or more aspects of the event data that may relate to specific events, trends, anomalies, characteristics, and/or variations thereof.

The data analytics 218 may generate the processed event data 224 from the event data. In some examples, the processed event data 224 may be the event data that has been reduced in size and complexity, and has been processed to emphasize the relevant portions of the event data. The data analytics 218 may provide the processed event data 224 to a data stream service, which may be present in an info data cache such as those described in connection with FIG. 1. In some examples, the data stream service may receive and/or transmit the processed event data 224 utilizing a data stream to various other systems. The data stream service may be a component of the info data cache configured to transmit and/or receive data as a sequence of digital signals. The data stream service may utilize one or more data transmission services that may provide various data streams that customers of the services may utilize to transmit data. In some examples, the data stream service may generate various data streams that may be utilized to transmit data.

In various embodiments, a health service 226 may be utilized to monitor the analytics cells 204A-204N. A health service 226 may refer to one or more computer servers of a computing resource service provider that store computer-readable executable instructions that, as a result of execution, cause one or more processors to identify failures of analytics cells which prevent de-registration from occurring and/or scale up/down computing resources for analytics cells based on demand. Health service 226 may monitor queue 214 and poll the queue 214 to determine how many messages have been sent and how many messages have been received. If there is a mismatch between the number of sent messages being substantially higher than the number of received messages, health service 226, it may indicate an issue with analytics cells 204A-204N. Cells may be forcefully shut down, de-registered, and new cells spawned for the same account and re-registered with analytics cell router 202 as part of a failure recovery routine that health service 226 causes to be executed as a result of detecting an potential problem. The health service 226 may be denoted as an analytics cell health service, analytics health service, cell health service, and/or variations thereof, and may monitor the performance of the analytics cells 204A-204N. The health service 226 may monitor the analytics cells 204A-204N and determine if any analytics cells of the analytics cells 204A-204N are not processing messages and/or data appropriately. The health service 226 may monitor the queues of the analytics cells 204A-204N to determine and/or identify if any analytics cells of the analytics cells 204A-204N are encountering problems or errors in processing messages and/or data appropriately. The health service 226 may generate or otherwise obtain new analytics cells to repair or replace any analytics cells of the analytics cells 204A-204N that are not processing messages and/or data appropriately, or mitigate any errors that any analytics cells of the analytics cells 204A-204N may be experiencing. In some examples, an analytics cell of the analytics cells 204A-204N may be lagging in processing. The health service 226 may be configured to generate or otherwise obtain another analytics cell to assist the analytics cell of the analytics cells 204A-204N that may be lagging in processing. The health service 226 may also be configured to scale the analytics cells 204A-204N in response to increased workloads or processing requirements by adding more analytics cells to the analytics cells 204A-204N.

Figure 3:
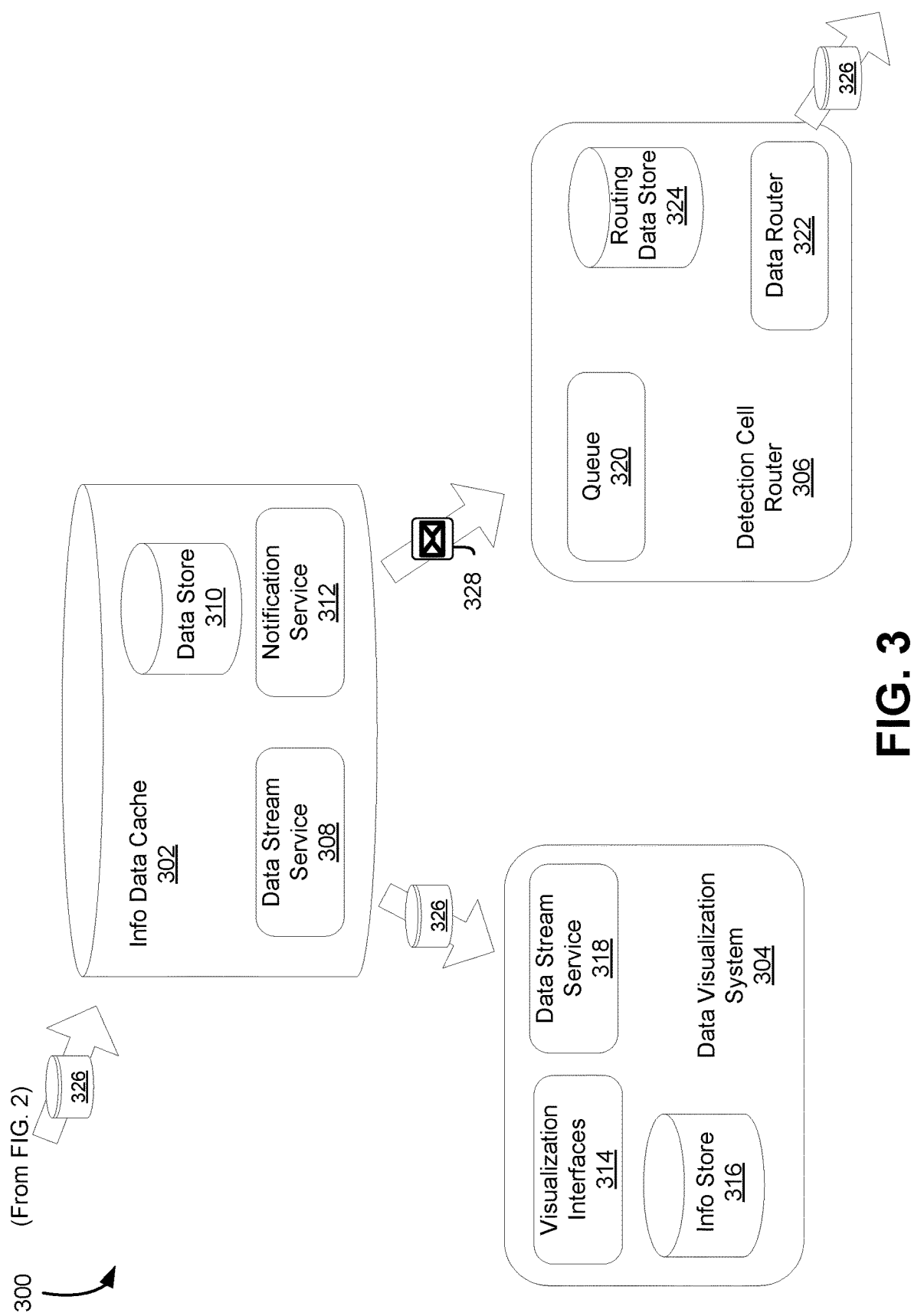
FIG. 3 illustrates an example of an info data cache, a data visualization system, and a detection cell router, according to at least one embodiment.

FIG. 3 illustrates an example 300 of an info data cache, a data visualization system, and a detection cell router. Specifically, FIG. 3 depicts an info data cache 302, which may comprise a data stream service 308, a data store 310, and a notification service 312, and may receive processed event data 326. The info data cache 302 may provide the processed event data 326 to a data visualization system 304, which may comprise visualization interfaces 314, an info store 316, and a data stream service 318. The info data cache 302 may transmit a message 328 to a detection cell router 306, which may comprise a queue 320, a data router 322, and a routing data store 324. In various embodiments, the info data cache 302, data visualization system 304, and detection cell router 306 may be the same or different as the info data cache 108, data visualization system 112, and detection cell router 110, respectively, as described in connection with FIG. 1.

The info data cache 302 may obtain the processed event data 326 from a data stream. The info data cache 302 may utilize the data stream service 308 to obtain the processed event data 326, which may have been transmitted in a data stream accessible by the data stream service 308. In some examples, the processed event data 326 may be transmitted from an analytics cell; further information regarding analytics cells may be found in the description of FIG. 2. In various embodiments, the processed event data 326 may be event data associated with a customer of a computing service provider that has undergone various de-serialization, parsing, aggregation, enrichment, and correlation actions. The info data cache 302 may store the processed event data 326 in the data store 310. The info data cache 302 may be configured to aggregate and store processed event data from a plurality of analytics cells in the data store 310. The data store 310 may be a data store or database that may be maintained by the info data cache 302, or accessed by the info data cache 302 via one or more data storage services, that may be configured to store processed data for further use. The data stream service 308 may be a component of the info data cache 302 that may be configured to transmit and/or receive data as a sequence of digital signals. The data stream service 308 may generate and/or utilize various data streams to transmit data. In some examples, the data stream service 308 may utilize data streams provided by one or more other data transmission services to transmit data. The info data cache 302 may utilize the data stream service 308 to provide the processed event data 326 to the data visualization system 304. The data stream service 308 may obtain and/or generate a data stream, and utilize the data stream to transmit the processed event data 326. The data visualization system 304 may receive the processed event data 326 via the data stream service 318, which may be a component of the data visualization system 304 like the data stream service 308. The data stream service 318 may access the specific data stream utilized by the data stream service 308 to obtain the processed event data 326.

The data visualization system 304 may be a system configured to visualize data and provide one or more interfaces that entities may utilize to interact with the data. The data visualization system 304 may be referred to as a data processing service. The data visualization system 304 may receive the processed event data 326, and store the processed event data 326 in the info store 316. In various embodiments, the info store 316 may be a data store or database that may be utilized by the data visualization system 304 to store and process received data. The info store 316 may be provided by one or more data storage services associated with the data visualization system 304. The data visualization system 304 may utilize the visualization interfaces 314 to perform various data visualization processes that may generate various interfaces and visualizations of the processed event data 326. The visualization interfaces 314 may be a component of the data visualization system 304 that may be configured to generate and/or maintain one or more interfaces and visualizations based on processed data. The visualization interfaces 314 may provide one or more services and/or interfaces usable by customers of the computing service provider to interact with and analyze the processed event data 326. The visualization interfaces 314 may allow a customer to define custom dashboards that may enable the customer to isolate and analyze specific subsets of the processed event data 326. The custom dashboards may be utilized by the customer to troubleshoot the processed event data 326, as well as detect and/or analyze any anomalies within the processed event data 326. The visualization interfaces 314 may further provide interfaces that customers may utilize to search or query the processed event data 326 to identify specific data, aspects, trends, and/or characteristics of the processed event data 326. For example, a customer may desire to obtain and view data of the processed event data 326 relating to a specific action; the customer may utilize one or more interfaces provided by the visualization interfaces 314 to query the processed event data 326 to find data associated with the specific action.

The info data cache 302 may also provide the message 328 to the detection cell router 306. The info data cache 302 may utilize the notification service 312 to transmit the message 328. The notification service 312 may be a component of the info data cache 302 that may be configured to transmit messages, notifications, indications, and/or variations thereof, to various systems. The message 328 may indicate that the processed event data 326 has been obtained by the info data cache 302. The detection cell router 306 may receive the message 328 from the info data cache 302 and perform various processes in connection with the message 328. The detection cell router 306 may store the message 328 in the queue 320. In various embodiments, the detection cell router 306 may store each incoming message in the queue 320, and process the messages sequentially in the order that the messages were received.

The detection cell router 306 may obtain the processed event data 326 indicated by the message 328. In some examples, the detection cell router 306 may obtain the processed event data 326 from the info data cache 302. The detection cell router 306 may interact with the data store 310 and retrieve the processed event data 326 from the data store 310. In various examples, the detection cell router 306 may obtain the processed event data 326 from one or more data stores that may be associated with the info data cache 302. In various embodiments, the message 328 may indicate a network location where the processed event data 326 may be stored; the detection cell router 110 may obtain the processed event data 326 utilizing the network location.

The detection cell router 306 may route the processed event data 326 to a plurality of detection cells. The detection cell router 306 may utilize the data router 322 to route the processed event data 326. The data router 322 may be a networking component of the detection cell router 306 that may be configured to route and transmit data to one or more other systems. The data router 322 may utilize various communication networks and protocols to transmit data. The data router 322 may route the processed event data 326 to a plurality of detection cells, which, in some examples, may each comprise detection rules configured to detect various events, anomalies, and/or other various aspects of the processed event data 326. In some examples, the detection cell router 306 may utilize a consistent hashing scheme, which may be maintained by the routing data store 324, to determine which detection cell to route the processed event data 326 to. The detection cell router 306 may utilize a customer identifier associated with the processed event data 326 to determine which detection cell to route the processed event data 326 to. In various examples, the detection cell router 306 may utilize any field, indicator, identifier, and/or variations thereof associated with the processed event data 326, to determine which detection cell to route the processed event data 326 to. In some embodiments, a specific subset of the plurality of detection cells may be associated with a specific data set, in which processed event data associated with and/or originating from the specific data set may be routed to one or more detection cells of the specific subset.

Figure 4:
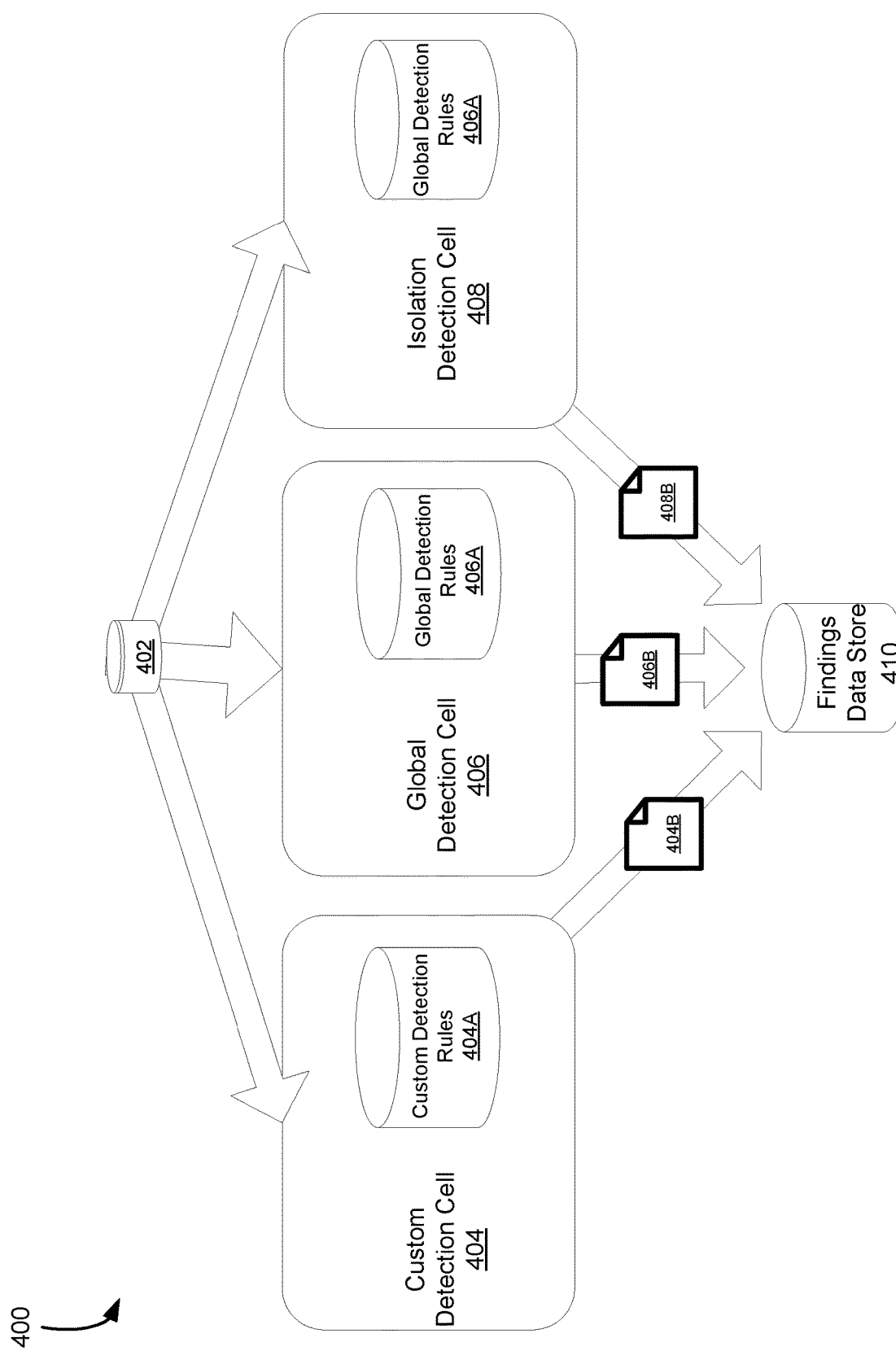
FIG. 4 illustrates an example of detection cells, according to at least one embodiment.

FIG. 4 illustrates an example 400 of types of detection cells. Specifically, FIG. 4 depicts processed event data 402, which may be provided to a custom detection cell 404 comprising custom detection rules 404A, a global detection cell 406 comprising global detection rules 406A, and an isolation detection cell 408; the detection cells 404-408 may provide findings 404B, 406B, and 408B, to a findings data store 410. The processed event data 402 may be the same or different as the processed event data 326 as described in connection with FIG. 3. The processed event data 402 may be provided to the custom detection cell 404, the global detection cell 406, and the isolation detection cell 408 via a detection cell router; further information regarding the detection cell router may be found in the description of FIG. 3.

The detection cells 404-408 may each be configured to detect various events, anomalies, and/or other various aspects of the processed event data 402. The detection cells 404-408 may utilize various security detection logics. The processed event data 402 may be event data relating to one or more customers of a computing service provider. The processed event data 402 may be associated with various customer identifiers of the one or more customers. The custom detection cell 404 may be configured to apply the custom detection rules 404A on the processed event data 402. The custom detection rules 404A may be provided by one or more entities that may desire to identify specific events or anomalies within the processed event data 402. The custom detection rules 404A may only apply to a specific subset of customer identifiers, and the custom detection cell 404 may utilize the custom detection rules 404A to detect specific conditions within data of the processed event data 402 associated with the specific subset of customer identifiers. In some examples, the custom detection cell 404 may only obtain or receive processed data associated with a specific subset of customer identifiers.

The global detection cell 406 may be configured to apply the global detection rules 406A on the processed event data 402. The global detection cell 406 may be configured to apply the global detection rules 406A to all of the processed event data 402, and may or may not specifically apply to a specific subset of customer identifiers. The global detection rules 406A may comprise a set of rules that may be configured to detect specific conditions, events, anomalies, and/or variations thereof, of any processed data that may be input to the global detection cell 406. In various embodiments, the global detection cell 406 may be part of a plurality of global detection cells, in which one or more subsets of the processed event data 402 may be routed to various global detection cells of the plurality of global detection cells. In some examples, the detection cell router may associate specific customer identifiers associated with one or more subsets of the processed event data 402 to specific global detection cells of the plurality of global detection cells. The detection cell router may utilize a consistent hashing scheme to map one or more subsets of the processed event data 402 to one or more global detection cells of the plurality of global detection cells that the global detection cell 406 may be part of.

The isolation detection cell 408 may be configured to assist the global detection cell 406. In some embodiments, if the global detection cell 406 is analyzing a sufficiently large amount of processed data, the isolation detection cell 408 may be utilized to assist in the analysis of the large amount of processed data. In various embodiments, a threshold amount of data may be defined such that, if data being processed within a global detection cell surpasses the threshold amount, an isolation detection cell may be utilized to offload and process some of the data from the global detection cell. In some examples, the isolation detection cell 408 may be configured such that it may only process data originating from a specific subset of customer identifiers, which may be associated with a specific subset of customers that may be denoted as "high bandwidth" customers that may generate large amounts of data. It should be noted that, in various embodiments, there may be any number of detection cells configured to detect any number of events, anomalies, conditions, and the like from processed data. For example, the processed event data 402 may be provided to other detection cells not depicted in the example 400 for additional processing and detection.

The custom detection cell 404 may determine findings 404B that may indicate any specific conditions, events, anomalies, and/or variations thereof that may have been detected by the custom detection cell 404 based on the custom detection rules 404A. The global detection cell 406 may determine findings 406B that may indicate any specific conditions, events, anomalies, and/or variations thereof that may have been detected by the global detection cell 406 based on the global detection rules 406A. The isolation detection cell 408 may determine findings 408B that may indicate any specific conditions, events, anomalies, and/or variations thereof that may have been detected by the isolation detection cell 408 based on the global detection rules 406A. The findings 404B, 406B, and 408B, may be provided to the findings data store 410 for further processing. The findings data store 410 may be a database or data store that may provide findings and results from detection cells to one or more other systems for further processing.

Figure 5:
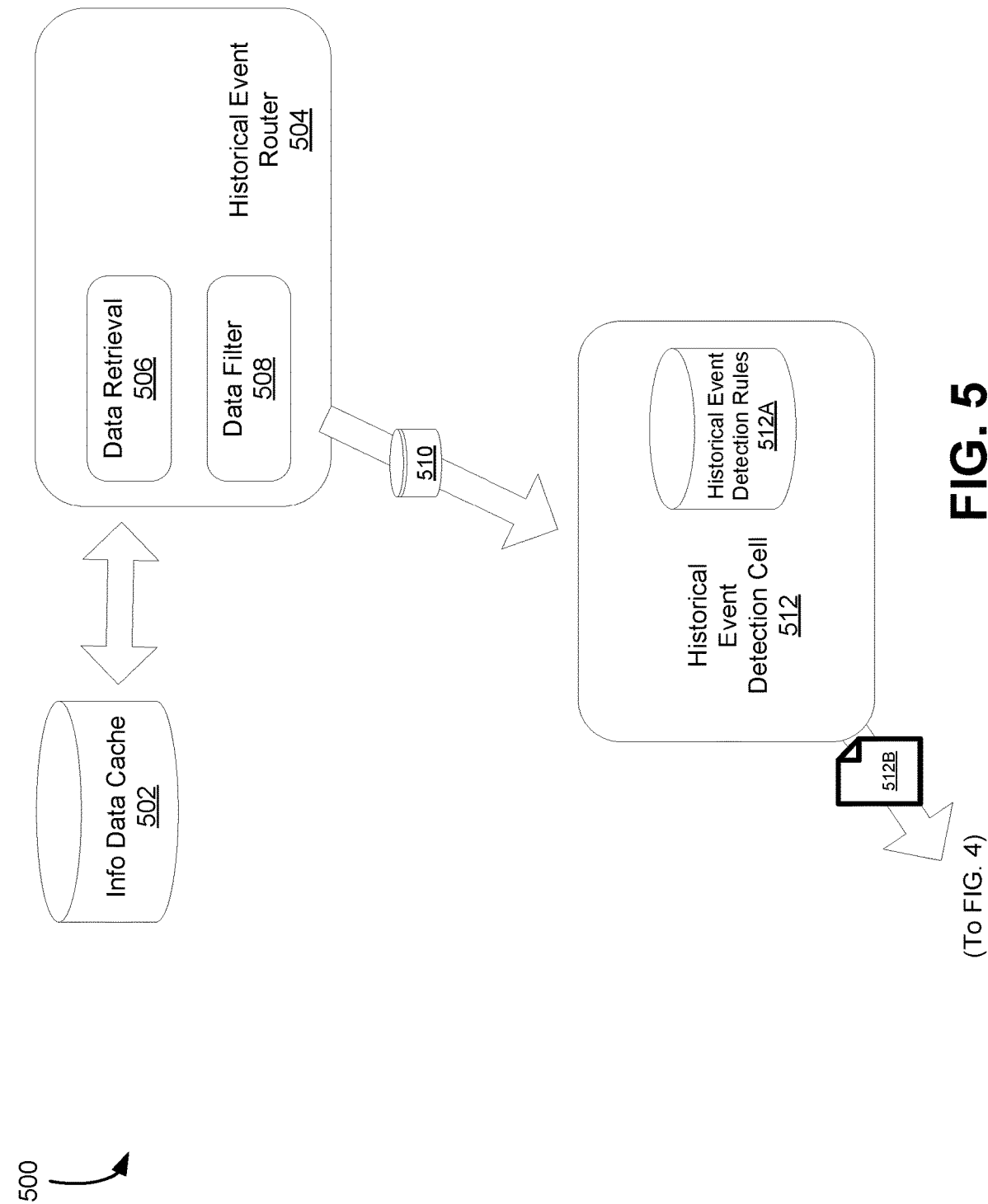
FIG. 5 illustrates an example of a historical event detection cell, according to at least one embodiment.

FIG. 5 illustrates an example 500 of a historical event detection cell. Specifically, FIG. 5 depicts an info data cache 502, which may be accessed by a historical event router 504 comprising a data retrieval 506 and a data filter 508. The historical event router 504 may route filtered data 510 to a historical event detection cell 512, which may comprise historical event detection rules 512A and may determine findings 512B utilizing the historical event detection rules 512A. The info data cache 502 may be the same or different as the info data cache 302 as described in connection with FIG. 3. In various embodiments, the historical event detection cell 512 may be a detection cell like those described in connection with FIG. 4.

The historical event detection cell 512 may be utilized to apply new or existing detection rules to historical event data. The historical event detection cell 512 may be configured to apply the historical event detection rules 512A, which may comprise various new or existing detection rules, to a set of historical event data. The historical event detection cell 512 may specify time ranges and one or more customer identifiers. The historical event detection cell 512 may apply the historical event detection rules 512A to event data that may be from the time ranges and may be associated with the one or more customer identifiers. The historical event router 504 may access the historical event detection cell 512. The historical event router 504 may utilize the data retrieval 506 to obtain the event data from the time ranges and associated with the one or more customer identifiers specified by the historical event detection cell 512. The data retrieval 506 may be a component of the historical event router 504 that may be configured to access data storage services. The data retrieval 506 may utilize various communication networks and interfaces to access various data storage services.

In some examples, the data retrieval 506 may retrieve the event data from the info data cache 502. The info data cache 502 may comprise a database or data store that may store all processed event data received by the info data cache 502. The data retrieval 506 may submit a request to the info data cache 502 comprising the time ranges and the one or more customer identifiers to retrieve the event data that corresponds to the time ranges and the one or more customer identifiers. In various examples, the data retrieval 506 may retrieve all of the event data stored in the info data cache 502, and provide the retrieved data to the data filter 508 which may filter the retrieved data to determine the event data that corresponds to the time ranges and the one or more customer identifiers. The data filter 508 may be a component of the historical event router 504 that may be configured to parse data, and filter out data based on pre-defined constraints and/or limitations (e.g., time ranges, specific customer identifiers, and/or variations thereof).

The historical event router 504 may provide the filtered data 510 to the historical event detection cell 512. In some alternative embodiments, the historical event router 504 may directly provide data retrieved from the info data cache 502 to the historical event detection cell 512 without any filtering. The historical event detection cell 512 may apply various detection rules as specified by the historical event detection rules 512A to the filtered data 510. The historical event detection cell 512 may determine findings 512B that may indicate any specific conditions, events, anomalies, and/or variations thereof that may have been detected by the historical event detection cell 512 within the filtered data 510 based on the historical event detection rules 512A. The findings 512B may be provided to a data store such as those described in connection with FIG. 4 for further processing.

Figure 6:
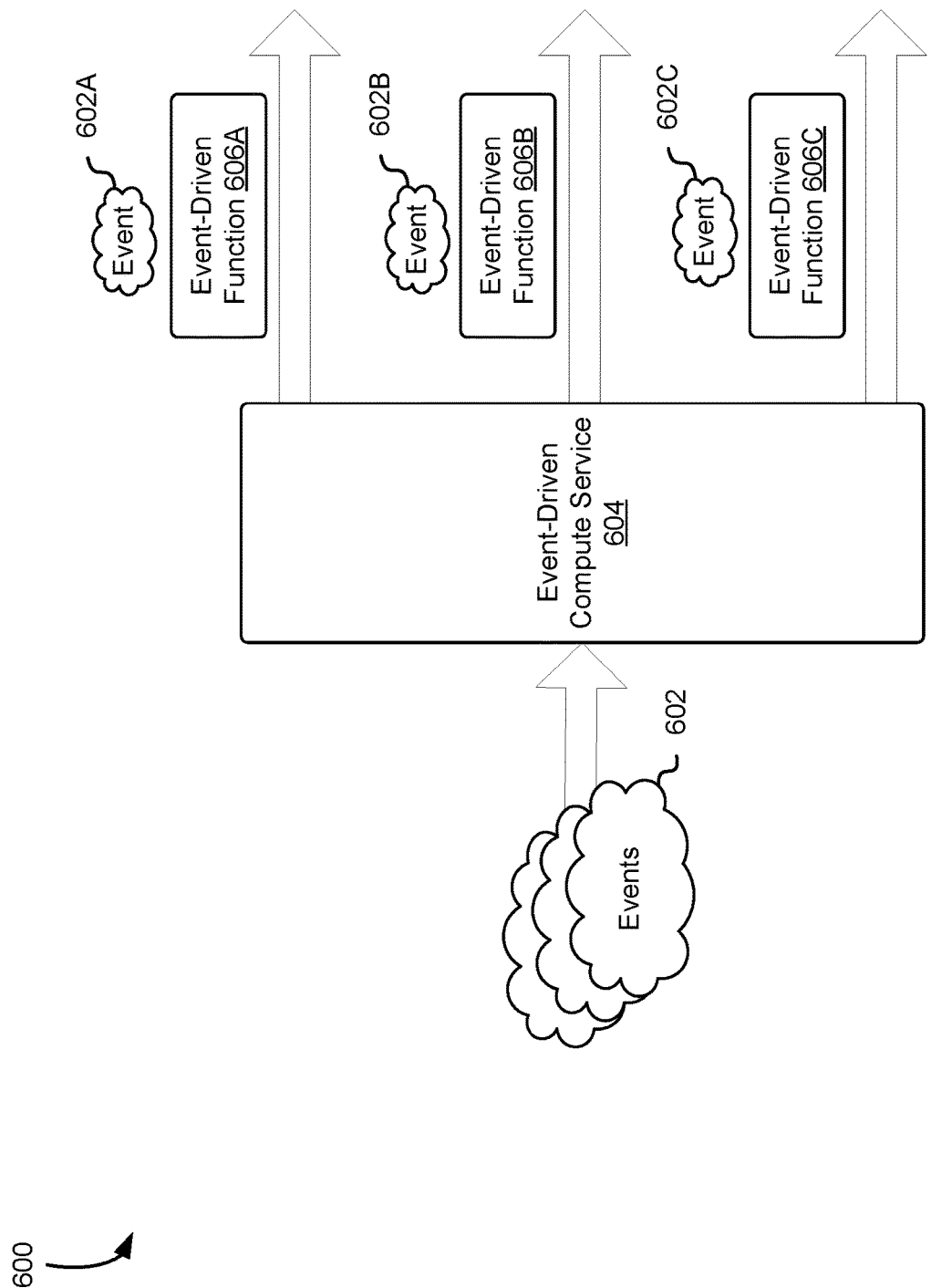
FIG. 6 illustrates a computing environment in which an event-driven compute service may be utilized to invoke various custom logics, according to at least one embodiment.

FIG. 6 illustrates an environment in which various embodiments can be implemented. The computing environment 600 illustrates an example where an event-driven compute service 604 may be utilized to invoke various custom logics. An event-driven compute service 604 may receive and/or monitor events 602. In some embodiments, the events that the event-driven compute service 604 monitors include the outputs generated by a various components illustrated in FIG. 1. An event-driven compute service 604 may receive an alert, notification, or other type of trigger mechanism that indicates a specified condition is satisfied and determine, based on one or more factors associated with the specified condition whether to invoke various types of functions and/or logic.

An event-driven function (e.g., those illustrated in FIG. 6) may be invoked by the event-driven compute service 604 in response to detecting satisfaction of a condition. In an embodiment, the event-driven compute service 604 may be utilized to implement one or more components of the system depicted in the example 100 of FIG. 1. In some embodiments, the event-driven compute service 604 detects satisfaction of the condition, retrieves a custom logic to run (e.g., an event-driven function) and provisions a computing environment to run a routine that includes the custom logic. Custom logic may refer to any suitable logic as described herein, and may be implemented as code (e.g., executable or source code). The provisioning process may include, for example, allocating compute resources of a compute resource service provider to run a virtual machine instance, provisioning the virtual machine instance with a computing environment suitable for running the custom logic or routine associated with an event that has been triggered, and executing the custom logic or routine using the virtual machine instance. After the custom logic or routine has been executed, the computing resources (e.g., the virtual machine instance) that were allocated in response to the triggered event may be de-provisioned (e.g., the virtual machine instance may be terminated) such that computing resources are made available for other uses, such as other requests in a distributed computing environment that may be unrelated to the custom logic or routine referenced above.

As a second example architecture, the event-driven compute service 604 may detect satisfaction of a condition, create a new process or thread, and execute the event-driven function on the created process or thread. The process or thread may, upon determining the result of executing the compliance routine, provide the compliance result to the event-driven compute service using various inter-process communication (IPC) techniques, such as the use of remote procedure call (RPC) interfaces. After providing the result, the process or thread may be terminated, releasing computing resources.

The event-driven compute service 604 may be further configured to receive events from multiple data processing and analytics services. Accordingly, the event-driven compute service 604 may be used to aggregate the invocation of event-driven functions across data analytics being performed on multiple data streams. The event-driven compute service 604 may receive the events 602 and determine, either internally (e.g., using a component of the event-driven compute service) or externally (e.g., by delegating to another service) how to splice the events which may operate on different logics and/or different tables. As an example, the event-driven compute service 604 may include a mapping of custom logics to specific accounts or providers. In an embodiment, an event-driven compute service is a service provided by a computing resource service provider and is implemented as software code executed on a fleet of hardware servers controlled by, operated by, or otherwise utilized on behalf of a computing resource service provider. The event-driven compute service 604 may be accessible to a client computer system. In an embodiment, the event-driven compute service 604 is accessible to a client computer system via an endpoint that supports a series of web application programming interface requests. The requests may include a request that allows the client computer system to upload custom logics; a request to identify an event or condition that can be used to trigger the execution of a custom logic; and more. In an embodiment, some or all of the web API requests allow the client computer system to specify a set of computing resources (e.g., a configuration for the type of virtual machine instance) to provision as a result of detecting satisfaction of a condition. The condition can be defined based on the result of a computation—for example, the condition, in an embodiment, refers to the computation having a specified value, exceeding a threshold value, etc.

Custom logic 606A, 606B, and 606C may include executable code, routines, function pointers, input parameters to a routine, callback functions, API requests, or any combination thereof. As an example, the event-driven compute service 604 may include a mapping of processing routines to events that indicate which routines should be invoked. Invoking a routine may include executing code or providing executable code as part of a request. FIG. 6 shows multiple events 602 that are received by the event-driven compute service 604 and spliced such that custom logic is run based on the type of event. The custom logic 606A that is run in response to a first event 602A may be different from the custom logic 606B that is run in response to a second event 602B but need not be the case—the custom logic may, in some cases, be the same either literally (e.g., both events utilize a function pointer that runs the same executable code from memory) or logically (e.g., the same functional outcome). In some cases, the custom logic may use information included in the events 602A, 602B, and 602C to perform a workflow.

Figure 7A:
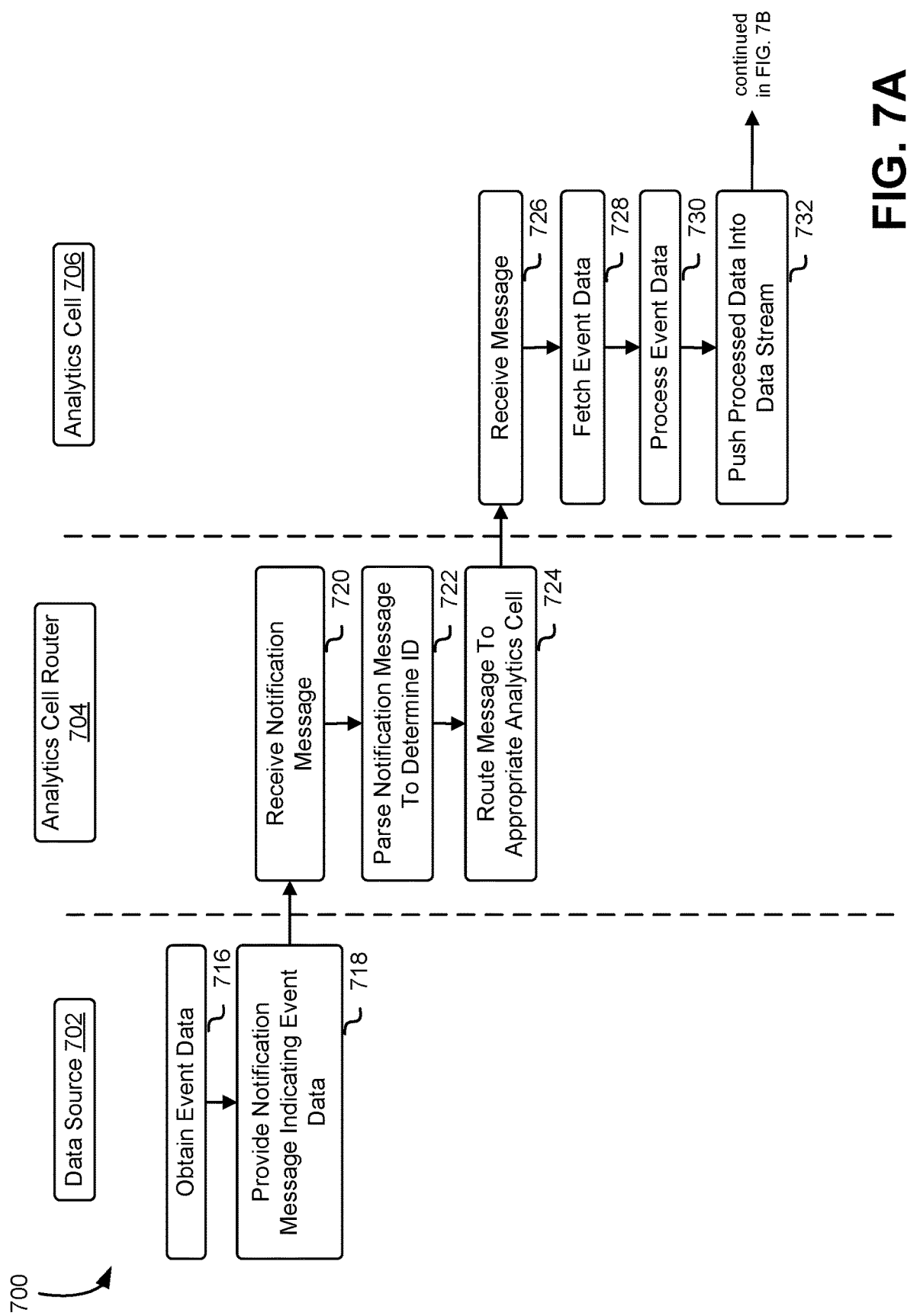
FIG. 7A is a swim diagram that illustrates an example of processing event data, according to at least one embodiment.

FIG. 7A is a swim diagram 700 illustrating an example of a process for processing event data, in accordance with various embodiments. Some or all of the process (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of the process may be performed by any suitable system, such as those described in connection with FIG. 9. The swim diagram 700 may include a data source 702, an analytics cell router 704, an analytics cell 706, an info data cache 708, a data visualization system 710, a detection cell router 712, and detection cells 714.

The data source 702 may obtain 716 event data. In various embodiments, the event data may be stored by the data source 702, or stored in one or more data stores that may be associated with the data source 702. In some examples, the data source 702 may obtain the event data from one or more data storage services. The event data may be data associated with customers of a computing service provider. The event data may also be metadata relating to the customers. The event data may comprise data such as event logs, metadata, and/or any such data related to the customers, as well as actions of the customers, of the computing service provider. The data source 702 may provide 718 a notification message indicating the event data to the analytics cell router 704. The notification message may be a data object or indicator that may indicate that the data source 702 has obtained the event data. The notification message may indicate one or more customer identifiers that may be associated with the event data. The notification message may additionally indicate a location of the event data.

The analytics cell router 704 may receive 720 the notification message. The analytics cell router 704 may store the notification message in a queue, and process the notification message from the queue. The analytics cell router 704 may parse 722 the notification message to determine a customer identifier. The notification message may indicate a customer identifier that is associated with the event data; the analytics cell router 704 may parse the notification message to determine the customer identifier. The analytics cell router 704 may route 724 the notification message to an appropriate analytics cell. The analytics cell router 704 may utilize a data store that may be associated the analytics cell router 704 to determine the appropriate analytics cell. The data store may comprise a mapping of customer identifiers to analytics cells. The data store may be configured to map a hash generated by a hash function from a customer identifier to a specific analytics cell. In some examples, the data store may utilize a consistent hashing scheme that may map various customer identifiers to various analytics cells. The analytics cell router 704 may utilize a hash function to determine a hash key from the customer identifier, and map the hash key to the appropriate analytics cell.

The analytics cell 706 may receive 726 the notification message. The analytics cell 706 may receive the notification message and store it in a queue, and process the notification message from the queue. The analytics cell 706 may fetch 728 the event data. The analytics cell 706 may fetch the event data utilizing the location indicated in the notification message. In some examples, the analytics cell 706 may fetch the event data from the data source 702. In various examples, the analytics cell 706 may fetch the event data from one or more data storage services that may be associated with the data source 702. The analytics cell 706 may process 730 the event data. The analytics cell 706 may perform various processes on the event data that may reduce the size of the event data and emphasize the relevant portions of the event data. The analytics cell 706 may de-serialize and parse the event data, and provide the de-serialized and parsed event data into a data stream for further processing. The de-serialized and parsed event data may be further processed through various aggregation, enrichment, and correlation actions to generate processed data. The analytics cell 706 may push 732 the processed data into a data stream. Further information regarding the processed data may be found in the description of FIG. 2.

Figure 7B:
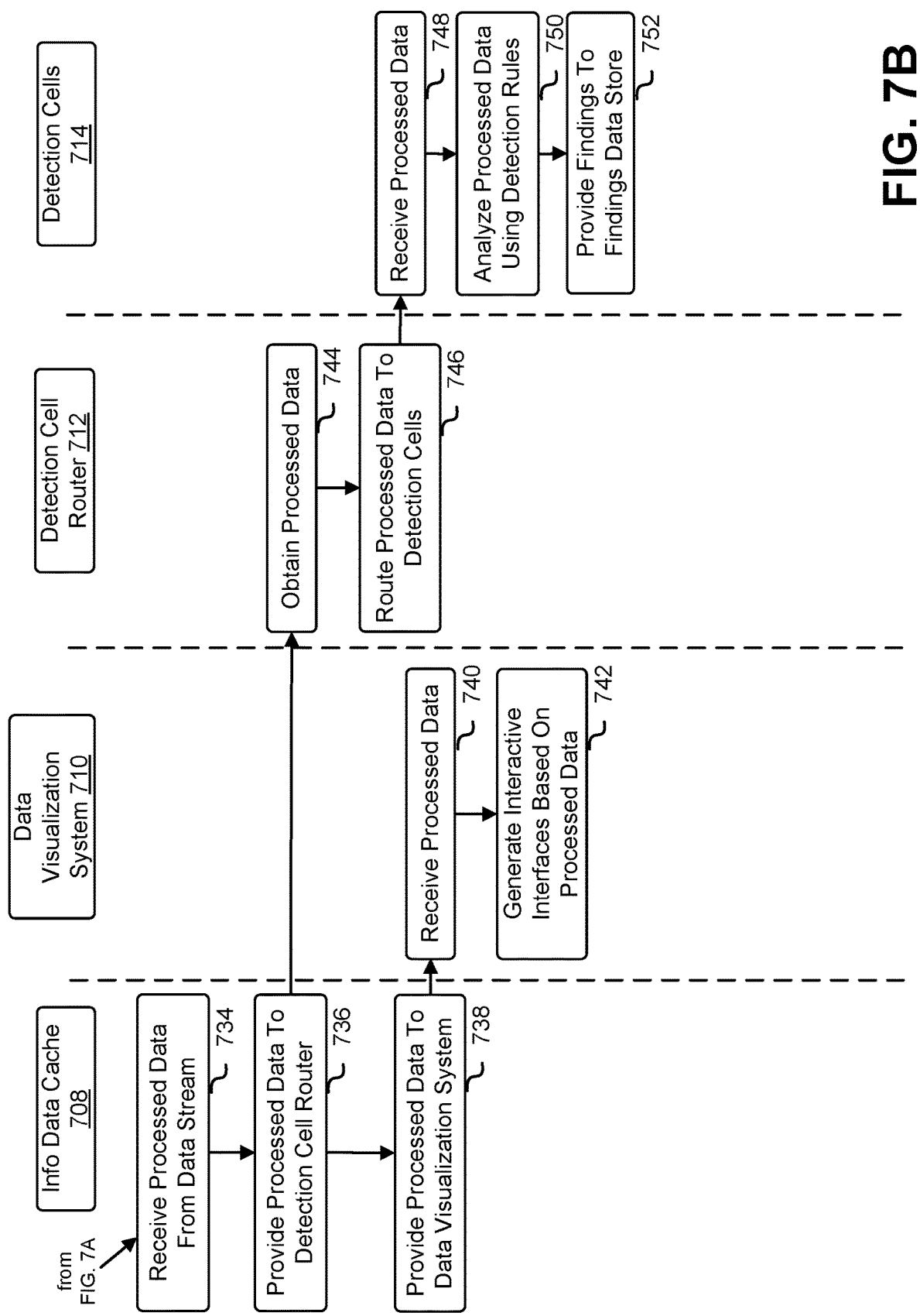
FIG. 7B is a swim diagram that illustrates an example of processing event data, according to at least one embodiment.

The swim diagram 700 may be continued in FIG. 7B. The info data cache 708 may receive 734 processed data from the data stream. The info data cache 708 may obtain the processed data by accessing the data stream that was utilized to transmit the processed data. The info data cache 708 may provide 736 the processed data to the detection cell router 712 utilizing one or more messages. The info data cache 708 may additionally provide 738 the processed data to the data visualization system 710. In some examples, the info data cache 708 may provide the processed data to the data visualization system 710 utilizing one or more data streams.

The data visualization system 710 may receive 740 the processed data. The data visualization system 710 may access one or more data streams to obtain the processed data. The data visualization system 710 may generate 742 interactive interfaces based on the processed data. In some examples, the interactive interfaces may be interfaces usable by one or more entities to query the processed data, analyze the processed data, visualize the processed data, and/or variations thereof. Further information regarding the info data cache, data visualization system, and detection cell router may be found in the description of FIG. 3.

The detection cell router 712 may obtain 744 the processed data. In some examples, the detection cell router 712 may receive a message from the info data cache 708 that may indicate the processed data. The detection cell router 712 may store the message in a queue that the detection cell router 712 may comprise. The detection cell router 712 may then obtain the processed data from the info data cache 708 utilizing the message, which may indicate a location of the processed data. The detection cell router 712 may route 746 the processed data to detection cells 714. The detection cells 714 may receive 748 the processed data. The detection cells 714 may analyze 750 the processed data using detection rules. In various embodiments, there may be various types of detection cells of the detection cells 714. The detection cells 714 may be configured to detect various events, anomalies, and/or other various aspects of the processed data. The detection cells 714 may provide 752 findings to a findings data store. The findings may be data objects that may represent any potential events, anomalies, conditions, and/or other various aspects that may have been detected by the detection cells 714 from the processed data. Further information regarding the detection cells may be found in the description of FIG. 4 and FIG. 5.

Figure 8:
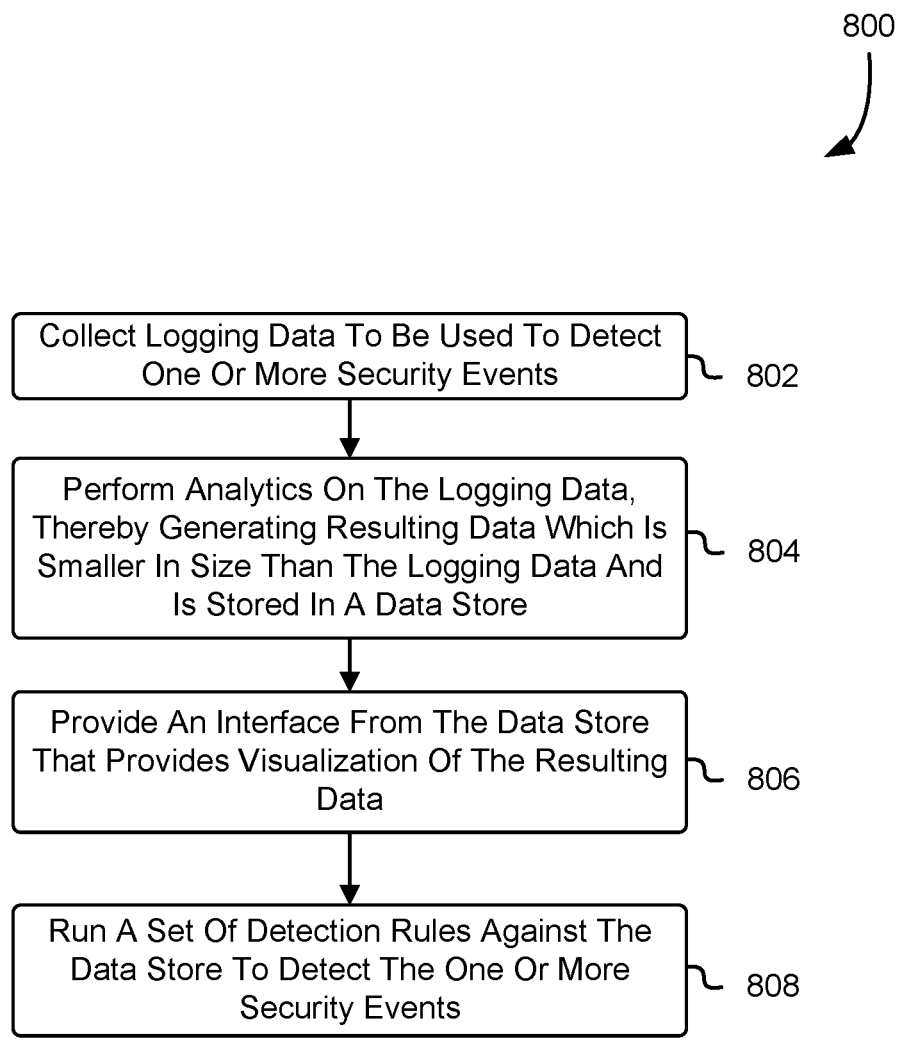
FIG. 8 is a flowchart that illustrates an example of processing logging data, according to at least one embodiment.

FIG. 8 is a flowchart illustrating an example of a process 800 for analyzing logging data, in accordance with various embodiments. Some or all of the process 800 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 800 may be performed by any suitable system, such as a server in accordance with those described in connection with FIG. 9.

The system performing the process 800 may collect 802 logging data to be used to detect one or more security events. The logging data may comprise data associated with customers of a computing service provider. The system may collect the logging data from various data feeds or streams. The system may obtain the logging data from one or more data stores associated with the computing service provider. The logging data may comprise data associated with actions of the customers of the computing resource provider. In various embodiments, logging data may be referred to as event data, security data, event logs, metadata, and/or variations thereof.

The system performing the process 800 may perform 804 analytics on the logging data, thereby generating resulting data which is smaller in size than the logging data and is stored in a data store. The system may perform the analytics utilizing various systems, such as an analytics cell router and analytics cells; further information regarding the analytics cell router and analytics cells may be found in the description of FIG. 2. The system may perform various processes in connection with the logging data to generate the resulting data. The system may parse and de-serialize the logging data. The system may perform various aggregation, correlation, and enrichment actions on the logging data. The system may store the resulting data in the data store, which may be a system such as those described in connection with FIG. 3.

The system performing the process 800 may then provide 806 an interface from the data store that provides visualization of the resulting data. The system may generate one or more interfaces that may allow various entities to interact with the resulting data. The interfaces may allow entities to query the resulting data, analyze the resulting data, visualize the resulting data, and/or otherwise interact with the resulting data. The system may utilize a data visualization system to provide the interface from the data store; further information regarding the data visualization system may be found in the description of FIG. 3.

The system performing the process 800 may run 808 a set of detection rules against the data store to detect the one or more security events. In some embodiments, the resulting data stored in the data store may be transmitted to a detection cell router, which may route the resulting data to one or more detection cells that may each be configured to run sets of detection rules against the resulting data. Further information regarding the detection cell router and detection cells may be found in the description of FIG. 4 and FIG. 5. The system may utilize the detection rules to detect various events, anomalies, conditions, and/or other various aspects of the resulting data. The system may provide findings based on the detection rules to a findings data store for further processing.

Figure 9:
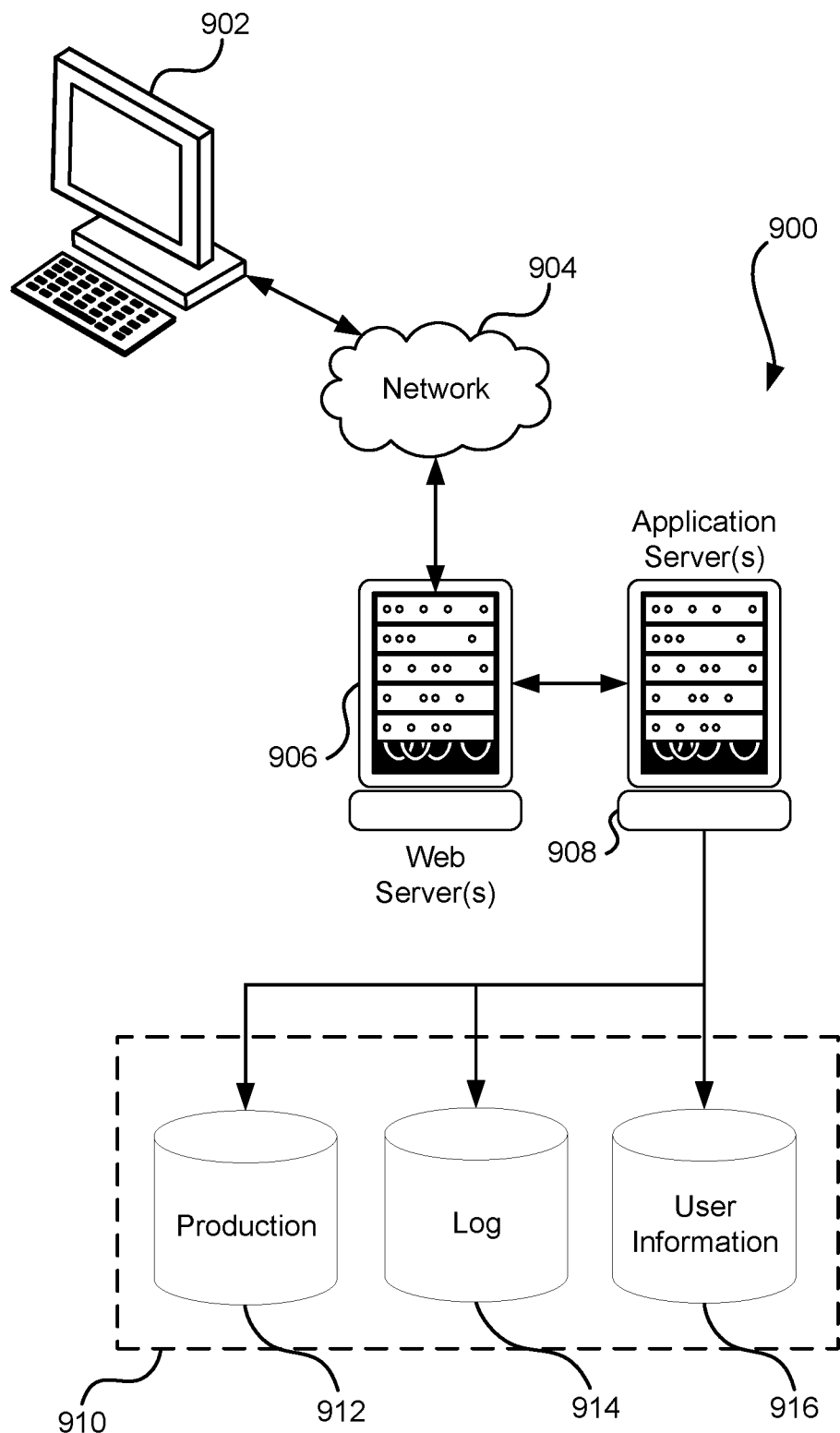
FIG. 9 illustrates a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto, and the application server 908 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

In various embodiments, a computing resource is configured to perform various tasks (e.g., generate data, process data, route messages, submit commands) by loading the computing resource with computer-readable executable instructions which, as a result of execution by one or more processors, cause the computing resource to perform those tasks. In various embodiments, software applications are used to configure a computer system to execute specific commands, instructions, tasks, jobs, and more. A computer system may be configured to execute instructions encoded in a software application by load executable code of the software application into memory and using one or more processors of the computer system to run the executable instructions.

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIF S") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
   a first service of a computing resource service provider that routes a notification message by at least:
      receiving the notification message based at least in part on generation of event data associated with an account of the computing resource service provider;
      determining a customer identifier from the notification message;
      mapping the customer identifier to a queue of a plurality of queues, wherein the plurality of queues correspond to a respective plurality of computing systems; and
      enqueuing the notification message in the queue of the plurality of queues;
   at a computing system of the respective plurality of computing systems that corresponds to the queue:
      obtaining the notification message from the queue;
      using the notification message to obtain the event data from a network location of the computing resource service provider;
      processing the event data to produce processed data; and
      making the processed data available to a data stream; and
   at a second service of the computing resource service provider:
      obtaining the processed data from the data stream;
      determining one or more detection logics to run against the processed data to identify one or more security events at least by mapping, to the one or more detection logics:
         the customer identifier and
         a detected event in the processed data; and
      routing the processed data to the one or more detection logics.

2. The computer-implemented method of claim 1, further comprising, at a data processing service of the computing resource service provider:
   obtaining the processed data from the data stream; and
   providing, based at least in part on the processed data, one or more interfaces that provide one or more visualizations of the processed data.

3. The computer-implemented method of claim 1, wherein:
the one or more detection logics correspond to one or more different types of events; and
the plurality of computing systems correspond to the one or more different types of events.

4. The computer-implemented method of claim 1, wherein the mapping of the customer identifier to the queue of the plurality of queues comprises generating a hash key based at least in part on the customer identifier that maps to the queue.

5. The computer-implemented method of claim 1, further comprising:
running the one or more detection logics on the processed data to identify the one or more security events; and
as a result of identifying the one or more security events, routing the processed data back to the first service for additional processing.

6. A system, comprising:
at least one computing device configured to implement a plurality of services of a computing resource service provider, the at least one computing device comprising one or more processors and memory storing computer-executable instructions that, as a result of execution by the one or more processors, cause the at least one computing device to:
route, using a first service of the plurality of services, a notification message to a second service of the plurality of services;
cause the second service to:
process a set of data associated with generation of the notification message to produce a processed set of data; and
submit the processed set of data to a third service of the plurality of services that aggregates data from at least a portion of the plurality of services to produce aggregated data;
cause the third service to:
aggregate the processed set of data from the second service to produce the aggregated data; and
provide a message associated with the aggregated data to a fourth service of the plurality of services;
cause the fourth service to:
utilize the message to obtain the aggregated data;
determine one or more security detection logics to execute against the aggregated data by at least mapping, to the one or more security detection logics, an account of a customer of the computing resource service provider and an event detected in the processed set of data; and
make the aggregated data available to the one or more security detection logics;
execute the one or more security detection logics using the aggregated data; and
as a result of executing the one or more security detection logics: determine, from execution of the one or more security detection logics, a set of findings based on the aggregated data from the fourth service; and
store the set of findings from the one or more security detection logics, to a findings data store for additional processing.

7. The system of claim 6, wherein:
the first service is a routing service;
the second service is an analytics service of a plurality of analytics services;
the third service is a data streaming service; and
the fourth service is a data storage service.

8. The system of claim 6, wherein:
the notification message comprises a customer identifier; and
the computer-executable instructions that cause the at least one computing device to route the notification message to the second service further cause the at least one computing device to:
generate a cryptographic key based at least in part on the customer identifier; and
map the cryptographic key to the second service.

9. The system of claim 7, wherein the plurality of analytics services is associated with an analytics health service to:
identify errors associated with the plurality of analytics services;
mitigate the errors associated with the plurality of analytics services; and
scale the plurality of analytics services.

10. The system of claim 6, wherein the set of data is associated with the notification message and is retrieved based at least in part on the notification message.

11. The system of claim 6, wherein the second service processes the set of data by de-serializing the set of data and parsing the set of data.

12. The system of claim 6, wherein the computer-executable instructions that cause the at least one computing device to cause the third service to process the aggregated data and make the aggregated data available via the fourth service further include instructions that cause the at least one computing device to cause the third service to execute one or more data visualization processes using the aggregated data made available via the fourth service.

13. The system of claim 12, wherein the one or more data visualization processes generate one or more data visualization interfaces usable by one or more customers of the plurality of services to at least:
query the aggregated data;
analyze the aggregated data; and
visualize the aggregated data.

14. The system of claim 6, wherein the additional processing determines a remediation action to mitigate errors associated with the second service.

15. A non-transitory computer-readable storage medium storing computer-executable instructions that, as a result of being executed by one or more processors of a computer system, cause the computer system to at least:
route, using a first service of a plurality of services, a notification message to a second service of the plurality of services, wherein the plurality of services are implemented by the computer system;
cause the second service to:
process a set of data associated with generation of the notification message to produce a processed set of data; and
submit the processed set of data to a third service of the plurality of services that aggregates data from at least a portion of the plurality of services to produce aggregated data;
cause the third service to:
aggregate the processed set of data from the second service to produce the aggregated data; and
provide a message associated with the aggregated data to a fourth service of the plurality of services;

cause the fourth service to:
  utilize the message to obtain the aggregated data;
  determine a security detection logic to execute against the aggregated data by at least mapping, to the security detection logic, an account of a customer of a computing resource service provider and an event detected in the processed set of data; and
  make the aggregated data available to the security detection logic;
execute the security detection logic using the aggregated data; and
as a result of executing the security detection logic:
  determine, from execution of the security detection logic, a set of findings based on the aggregated data from the fourth service; and
  store the set of findings from the security detection logic, to a findings data store for additional processing.

16. The non-transitory computer-readable storage medium of claim 15, wherein:
  the first service is a routing service;
  the second service is an analytics service of a plurality of analytics services;
  the third service is a data streaming service; and
  the fourth service is a data storage service.

17. The non-transitory computer-readable storage medium of claim 15, wherein:
  the notification message comprises a customer identifier; and
  the computer-executable instructions that cause the computer system to route the notification message to the second service further cause the computer system to:
    generate a cryptographic key based at least in part on the customer identifier; and
    map the cryptographic key to the second service.

18. The non-transitory computer-readable storage medium of claim 16, wherein the plurality of analytics services is associated with an analytics health service to:
  identify errors associated with the plurality of analytics services;
  mitigate the errors associated with the plurality of analytics services; and
  scale the plurality of analytics services.

19. The non-transitory computer-readable storage medium of claim 15, wherein the second service processes the set of data by de-serializing the set of data and parsing the set of data.

20. The non-transitory computer-readable storage medium of claim 15, wherein the computer-executable instructions that cause the computer system to cause the third service to process the aggregated data and make the aggregated data available via the fourth service further include instructions that cause the computer system to cause the third service to execute a data visualization process using the aggregated data made available via the fourth service.

21. The non-transitory computer-readable storage medium of claim 20, wherein the one or more data visualization processes generate one or more data visualization interfaces usable by one or more customers of the plurality of services to at least:
  query the aggregated data;
  analyze the aggregated data; and
  visualize the aggregated data.

* * * * *